(12) United States Patent
Birndorfer et al.

(10) Patent No.: US 6,357,823 B1
(45) Date of Patent: Mar. 19, 2002

(54) DEVICE FOR INFLUENCING AN AIR FLOW

(75) Inventors: Robert Birndorfer, Weilheim; Helmut Höckmayr, Maisach; Michael Hanke, Munich, all of (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/731,046

(22) Filed: Dec. 7, 2000

(30) Foreign Application Priority Data

Dec. 7, 1999 (DE) .......................................... 199 58 742

(51) Int. Cl.⁷ .................................................. B60J 7/22
(52) U.S. Cl. ........................................................ 296/217
(58) Field of Search ......................................... 296/217

(56) References Cited

U.S. PATENT DOCUMENTS

| 4,268,085 | A |   | 5/1981 | Sakai et al. |
| 5,671,970 | A | * | 9/1997 | Edelmann ................... 296/217 |
| 5,833,305 | A |   | 11/1998 | Watzlawick et al. |
| 6,135,544 | A | * | 10/2000 | Kohlpaintner et al. ...... 296/217 |

FOREIGN PATENT DOCUMENTS

| DE | 1210346 | * | 2/1966 | ................. 296/217 |
| DE | 29 35 344 C2 |   | 3/1980 | |
| DE | 30 12 538 A1 |   | 10/1981 | |
| DE | 39 13 567 A1 |   | 10/1990 | |
| DE | 43 34 011 C1 |   | 11/1994 | |
| DE | 195 49 200 A1 |   | 7/1997 | |
| DE | 197 01 479 A1 |   | 7/1998 | |
| DE | 197 33 871 A1 |   | 2/1999 | |
| DE | 198 02 301 A1 |   | 7/1999 | |
| DE | 198 09 943 A1 |   | 9/1999 | |

* cited by examiner

*Primary Examiner*—Dennis H. Pedder
(74) *Attorney, Agent, or Firm*—Nixon Peabody LLP; David S. Safran

(57) ABSTRACT

In a device for influencing the air flow in the area of the roof opening (12) of an openable motor vehicle roof with a wind deflector (18) which is located in the area of the front edge of the roof opening and which is pivotably mounted on a roof-mounted frame (16) and can be raised into an operating position under the influence of a spring force (20), there is at least one stop (28) which is independent of the adjustment mechanism of other movable roof components (14) in order to limit the raising motion of the wind deflector (18). Furthermore, there is an adjustment device (26) for changing the position of the stop and thus the degree of opening of the wind deflector,

19 Claims, 6 Drawing Sheets

DEVICE FOR INFLUENCING AN AIR FLOW

BACKGROUND OF THE INVENTION

1. Field of the Invention

The invention relates to a device for influencing the air flow in the area of the roof opening of an openable motor vehicle roof having a wind deflector which is located in the area of the front edge of the roof opening, being pivotably coupled to the roof-mounted frame so that it can be raised into an operating position under the influence of a spring force.

2. Description of Related Art

Devices of the above-mentioned type are currently being used in most vehicles with an openable roof in order to deflect the air flow which streams over the motor vehicle roof during driving of the vehicle so as to reduce the wind noise which arises when driving with the motor vehicle roof open.

Moreover, in particular, in motor vehicles with a roof opening which can be closed by means of a sliding or sliding/lifting cover, it has been shown that, especially for covers which are opened wide or completely opened, low frequency air vibrations are formed. At certain motor vehicle speeds, the vehicle interior acts as a resonator so that air vibrations with considerable intensity can develop, and they are generally perceived as very disturbing by the passengers; the term "rumbling" has been coined for this type of noise by specialists.

Since both the formation of disruptive airstream noise and the occurrence of rumbling depend on many parameters which can change continually as the vehicle is operating such as, for example, the degree to which the roof is opened and the vehicle speed, it has been found to be a good idea to provide wind deflectors in which the flow conditions can be changed during vehicle operation. Thus, for example, published German Patent Application DE 198 09 943 discloses a wind deflector for a motor vehicle roof with a movable cover for selective closing and at least partial clearance of a roof opening, and the wind deflector is located on the front edge of the roof opening and under the influence of the spring force can be swung into a position in which the wind deflector is lowered into a neutral position by means of laterally arranged raising means which are coupled to be able to swivel on a roof-mounted frame and by moving the cover into the cover closed position. Underneath the movable cover there is a movable sliding headliner for which there is a drive which is independent of the drive of the cover. The wind deflector is coupled to the drive of the sliding headliner such that, with the wind deflector raised, the degree of raising of the wind deflector can be changed by means of the drive of the sliding headliner. Although, with the wind deflector known from German Patent Application DE 198 09 943, the incident flow conditions can be individually varied, this device is disadvantageous in that the sliding head liner must be moved to adjust the angle of inclination of the wind deflector. In the known device, thus, what otherwise would be two fundamentally independent parameters are linked to one another. Specifically, on the one hand, the development of wind noise which can be influenced by means of the wind deflector, and on the other hand, the light incidence through the cover element which can be adjusted by the sliding headliner, and which is generally made of a transparent material when using a headliner element no longer can be independently adjusted.

SUMMARY OF THE INVENTION

In view of the problems which arise in devices known from the prior art, an object of this invention is to devise a device for influencing the air flow in the area of the roof opening of an openable motor vehicle roof, by means of which the incident flow conditions of the air flow streaming over the motor vehicle roof can be changed at will without other functions of the roof being adversely affected.

In a device for influencing the air flow in the area of the roof opening of an openable motor vehicle roof with a wind deflector which is located in the area of the front edge of the roof opening and which is pivotally coupled to the roof-mounted frame and can be raised under the influence of the spring force into an operating position, this object is achieved in that there is at least one stop which is independent of the adjustment mechanism of other movable roof components in order to limit the raising motion of the wind deflector, and furthermore, there is an adjustment device for changing the position of the stop, and thus, the degree of opening of the wind deflector. In the approach suggested here, thus, the angle of inclination of the raised wind deflector can be adjusted by positioning the stop for the spring-loaded wind deflector without, in doing so, having to change the setting of other movable roof components, especially a cover element which is provided for closing or at least partially exposing the roof opening or a headliner element which may be present under it.

Preferably, the stop is vertically adjustable so that conversion of the direction of action of the adjustment motion of the stop with respect to the wind deflector need not take place.

Especially in motor vehicle roofs with a movable cover element for selectively closing or at least partially clearing the roof opening, in which the cover element is guided along rails or the like which run along the roof opening, the adjustment means is preferably located in the roof-mounted frame in the area of the front edge of the roof opening so that any adverse effect of the displacement motion of the cover element is precluded from the start or can be prevented with relatively simple means.

The stop process takes place, preferably, by means of an actuating motor, according to one preferred embodiment, the adjustment means comprising an electronic control arrangement for triggering the actuating motor depending on pre-adjustable or freely selectable parameters so that the degree of raising of the wind deflector can be automatically adapted to the respective operating situation. In particular, there can be sensor technology coupled to the electronic control arrangement for acquiring the motor vehicle speed and/or the degree of roof opening, and in many cases, components already present on the vehicle can be used, for example, the vehicle speed signal which is provided anyway by the vehicle electronics and the position signal of the cover element which is provided by the drive motor of a cover element which is provided for closing the roof opening. As an alternative to a sensor for acquiring the vehicle speed, there can also be a sensor for determining the airstream speed when driving or the dynamic pressure.

In another embodiment of the invention, there can be several stops, in this case, the adjustment means comprising a lever mechanism in order to simultaneously adjust the position of all stops. In this way, the wind deflector can be set more uniformly over the entire width of the roof opening. Unwanted wobbling movements of the wind deflector as could occur when there is only one stop, especially at higher speeds, are effectively prevented by providing several stops. Here, the lever mechanism can have two essentially mirror-symmetrical lever components which are coupled in the area of the front edge of the roof opening such that one end of each lever component forms a stop for the wind deflector, while the other end of the lever component is coupled to the adjustment means, especially to the actuating motor. Preferably, a driver is mounted on the wind deflector and it interacts with a stop, in this case, it being especially advantageous if the driver is mounted on a pivoting lever arm which interacts with the wind deflector and there being an abutment which counteracts the pivoting of the lever arm when the stop engages the driver in order to limit the degree of opening of the wind deflector, but which allows pivoting of the lever arm when the wind deflector is lowered into its neutral position. In this embodiment of the proposed wind deflector device, the construction height of the device can be minimized; this is important especially in motor vehicle roofs in which the wind deflector is made to be lowered into a fixed roof frame which surrounds the roof opening. These embodiments are used especially in motor vehicle roofs which have a roof opening provided in a fixed roof surface and a cover element for closing or at least partially exposing the roof opening, for example, sliding roofs or sliding and lifting roofs, and the wind deflector device being made such that the wind deflector, in its neutral position, is lowered into the roof-mounted frame surrounding the roof opening and the cover element covers the wind deflector when the roof opening is closed.

In this motor vehicle roof, it is especially advantageous if there is at least one hold-down which is connected to the cover element and which provides for the lowering of the wind deflector during the closing motion of the cover element.

The invention is explained in greater detail below with reference to the accompanying drawings which show a preferred embodiment of the invention.

DETAILED DESCRIPTION OF THE INVENTION

Figure 1:
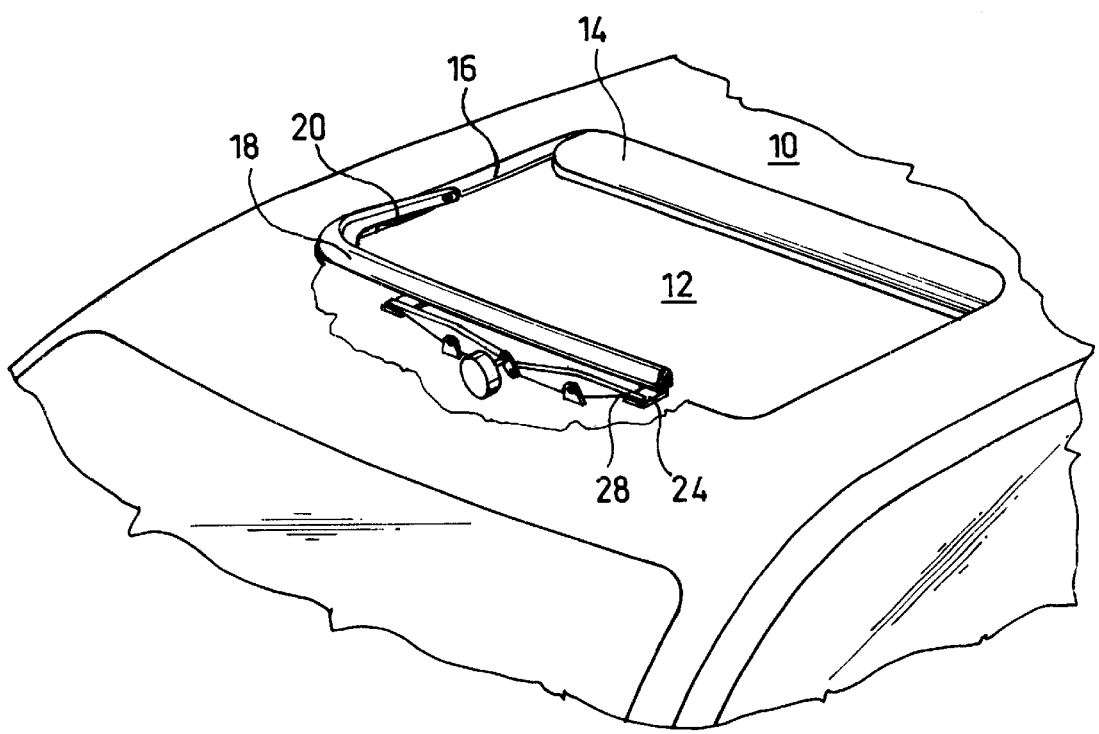
FIG. 1 is a perspective view, partially cutaway, of a motor vehicle roof with a wind deflector device in accordance with the invention.
Figure 5:
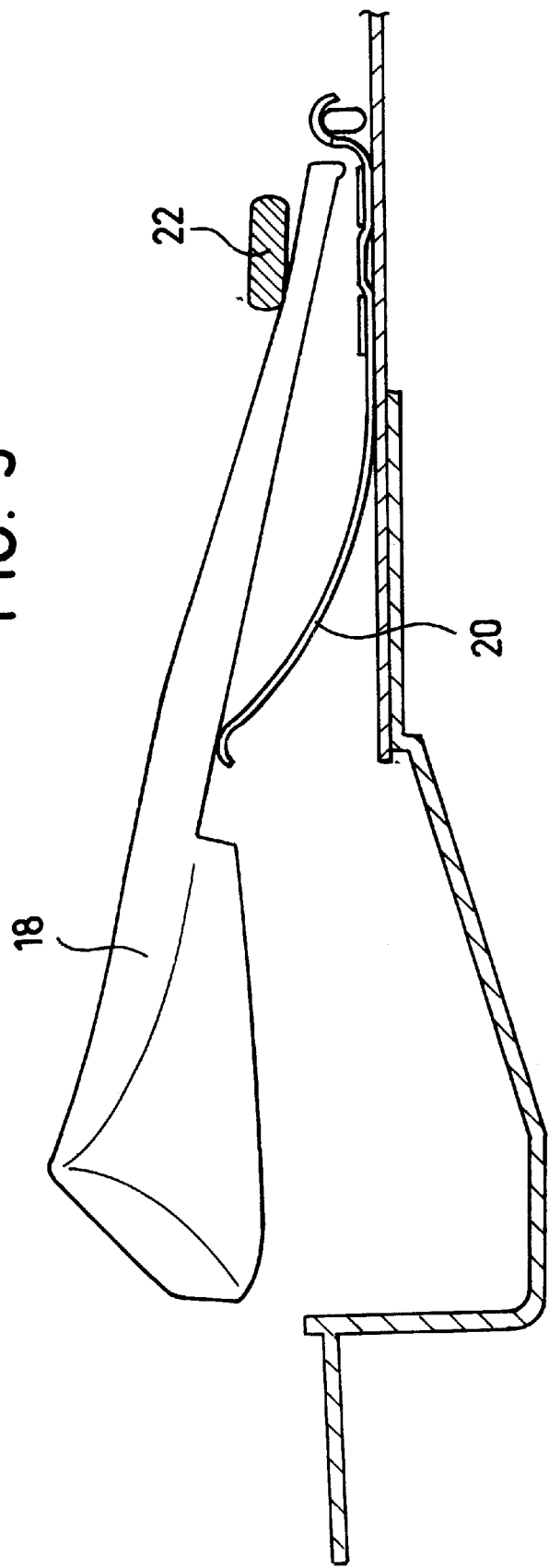
FIG. 5 is a schematic side view of the wind deflector of FIG. 1.

According to FIG. 1, a roof opening 12 is provided in the fixed surface 10 of a motor vehicle roof which can be closed or at least partially exposed by a cover element 14. Here, the cover element 14 is displaceably guided at lateral sides in the frame 16 which surrounds the roof opening, and a wind deflector 18 is mounted in the front area of frame 16 and surrounds the front edge of the roof opening and parts of the side areas of the roof opening. The ends of the wind deflector 18 which extend rearwardly are hinged in the area of the roof frame 16. As follows especially from FIG. 5, the wind deflector 18 is raised up by means of a spring element 20 as soon as the downward retaining force ceases to act on the wind deflector. As shown in FIG. 5, there can be a hold-down 22 which is connected to the cover element 14 and which provides for lowering of the wind deflector 18 during the closing motion of the cover element 14.

As follows from FIG. 1 and especially the sectional view from FIG. 3, the wind deflector 18 has two drivers 24 in the area of its front lower edge which project forward from the wind deflector to under the fixed roof skin 10. To adapt the vertical position of the wind deflector 18 to the respective operating circumstances, for example, especially the driving speed, there is an adjustment device 26 which comprises a stop 28 for each driver 24; by means of the stop, the driver 24, and thus the wind deflector 18, can be pressed down against the force of the spring element 20.

Figure 2:
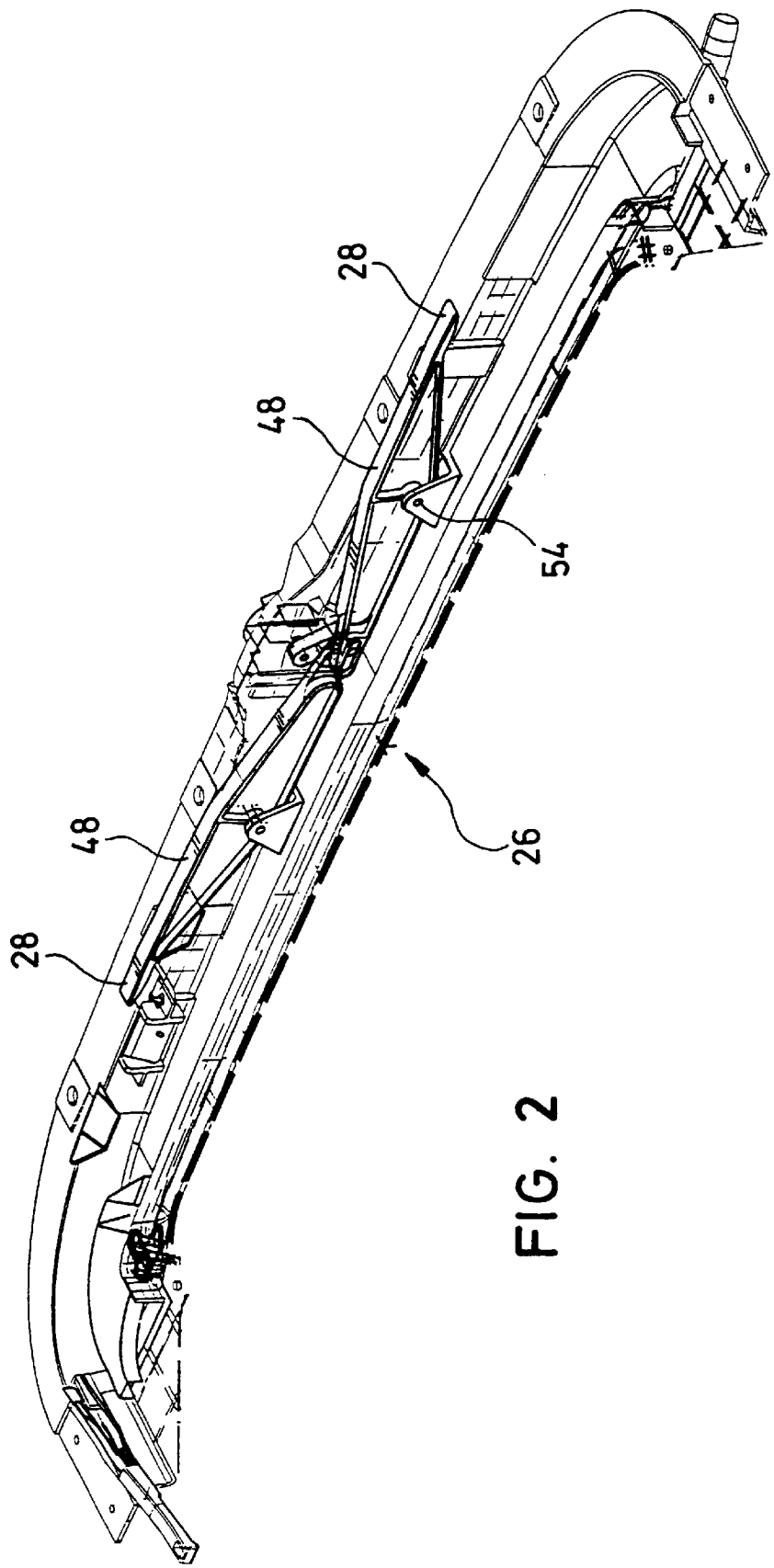
FIG. 2 is a perspective view of an adjustment device for adjusting the vertical position of the wind deflector shown in FIG. 1.
Figure 4:
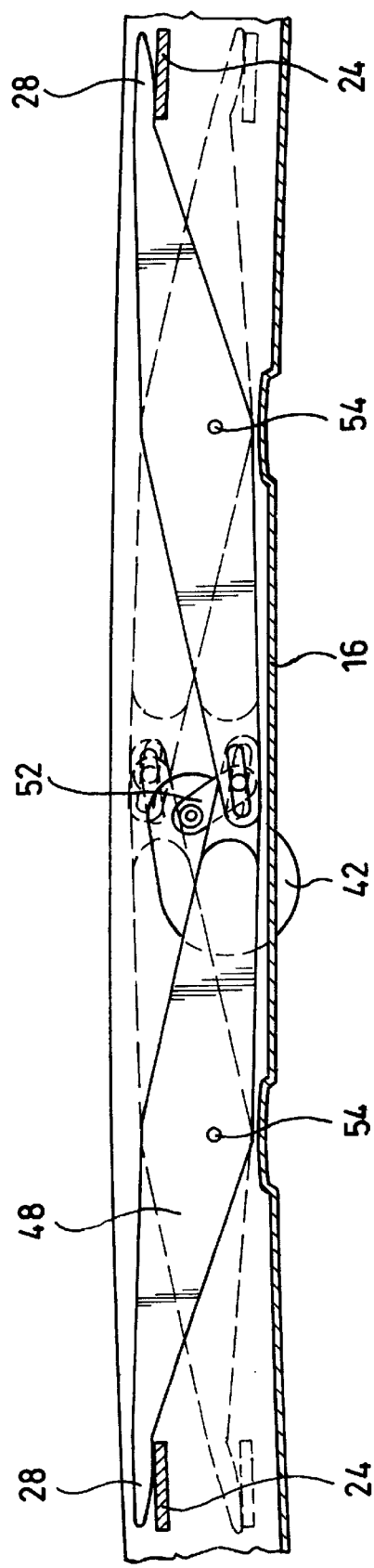
FIG. 4 is a view of the adjustment means in which simultaneous adjustment of two stops is illustrated.

In order to ensure uniform lowering of the wind deflector 18 over its entire width transversely to the roof opening 12, two drivers 24 are mounted on wind deflector 18. The adjustment device 26 according to FIGS. 2 & 4 comprises a lever mechanism with two essentially mirror-symmetrical actuating rockers 48 which are located in the roof frame 16 along the front edge of the roof opening 12. An actuating motor 42 is located in the transversely central area in the roof frame 16 and drives an actuating lever 52 which engages one end of the two actuating rockers 48. If, as is shown in FIG. 4 in solid lines, the actuating lever 52 is in its lower position, the opposing ends of the actuating rockers 48 which form (or carry) the stops 28 are in their top position. If the actuating motor 42 is driven, and in this way, the actuating lever 52 is displaced upward, the actuating rockers 48 are rotated around their axes of rotation 54 such that the ends of the actuating rockers 48 which form the drivers 28 are shifted down, as is shown in FIG. 4 in broken lines. Herewith in doing so, the stops 28 press the drivers 24 connected to the wind deflector 18, and thus, the wind deflector 18 itself down.

Figure 6:
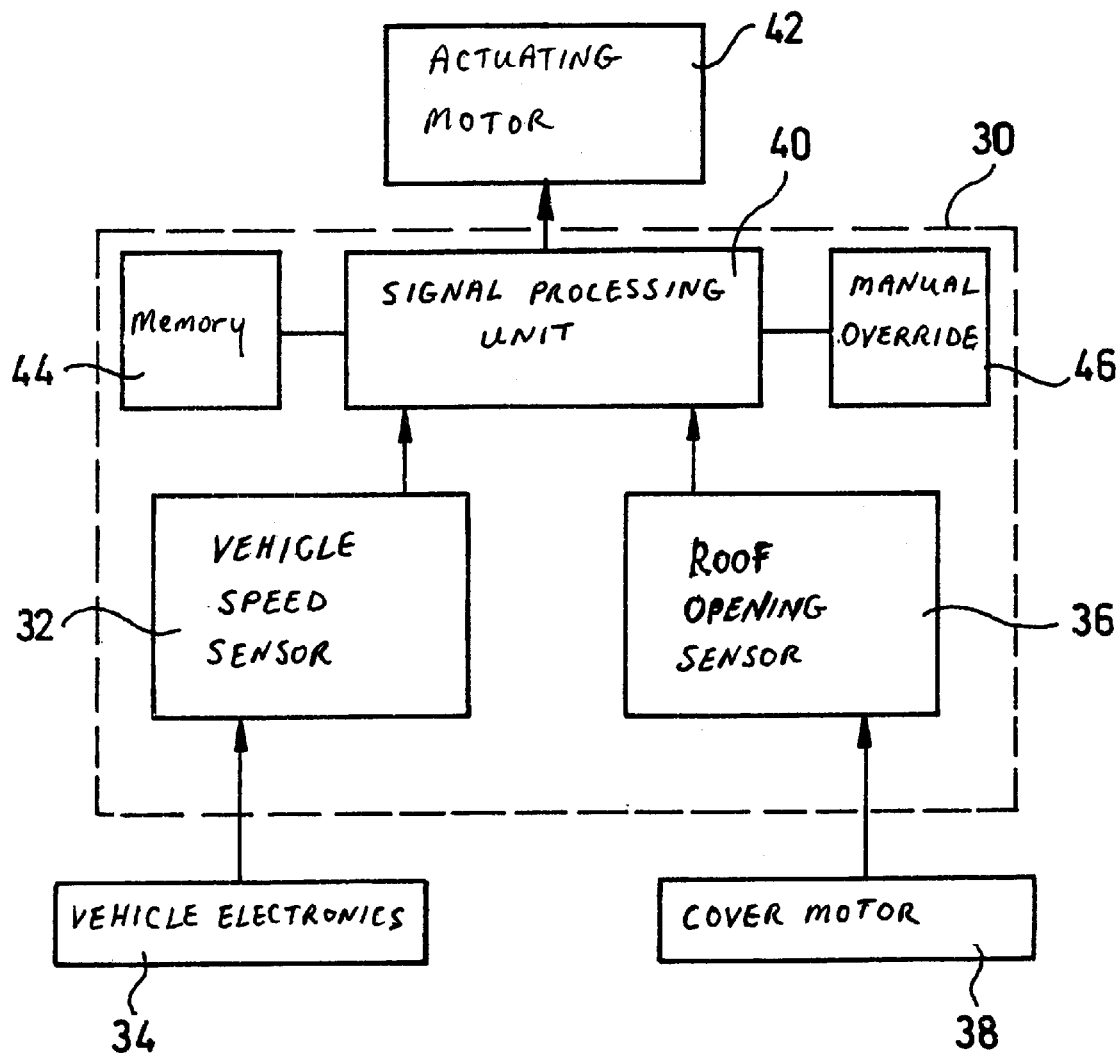
FIG. 6 is a block diagram of a circuit of an adjustment arrangement having an electronic control for vertical adjustment of the wind deflector.

The actuating motor 42 can be triggered here via control electronics 30, as is shown schematically in FIG. 6. The control electronics 30 comprises sensor technology 32, here, for determining the speed of the motor vehicle, and such a speed signal can, optionally, be derived directly from the vehicle electronics 34, since in many current types of motor vehicles an electrical vehicle speed signal is produced anyway. Furthermore, the control electronics 30 comprises sensor technology 36 for determining the degree of roof opening. Preferably, the sensor technology 36 is coupled to a motor 38 which is provided for moving the cover element 14.

Using the signals which have been made available by the sensor technology 32 and sensor technology 36, a signal processing unit 40 determines the vertical position of the wind deflector which is optimum for reducing both airstream noise and also rumbling, and then issues a position signal which is delivered to the actuating motor 42. The wind deflector 18 can be triggered, herewith in doing so, according to predetermined functions into which the vehicle speed and cover position are incorporated, or for example, using stipulated tables of values in which, depending on the cover position, discrete degrees of vertical adjustment are assigned to certain vehicle speed ranges. Since the optimum position of the wind deflector 18 depends on the geometrical circumstances of the motor vehicle roof in which the wind deflector is being used, the control electronics 30 preferably has a memory 44 which can be provided with the respective vehicle data or the actuating functions which are optimum for the given motor vehicle. In this way, the same wind deflector device can be used in different vehicle types or in different versions of the same vehicle type, and can be matched optimally to the respective circumstances. Furthermore, if desired, the control electronics 30 can have an arrangement 46 to manually override the electronically generated position signal and thus to enable the vehicle user to individually set the vertical position of the wind deflector.

Figure 3:
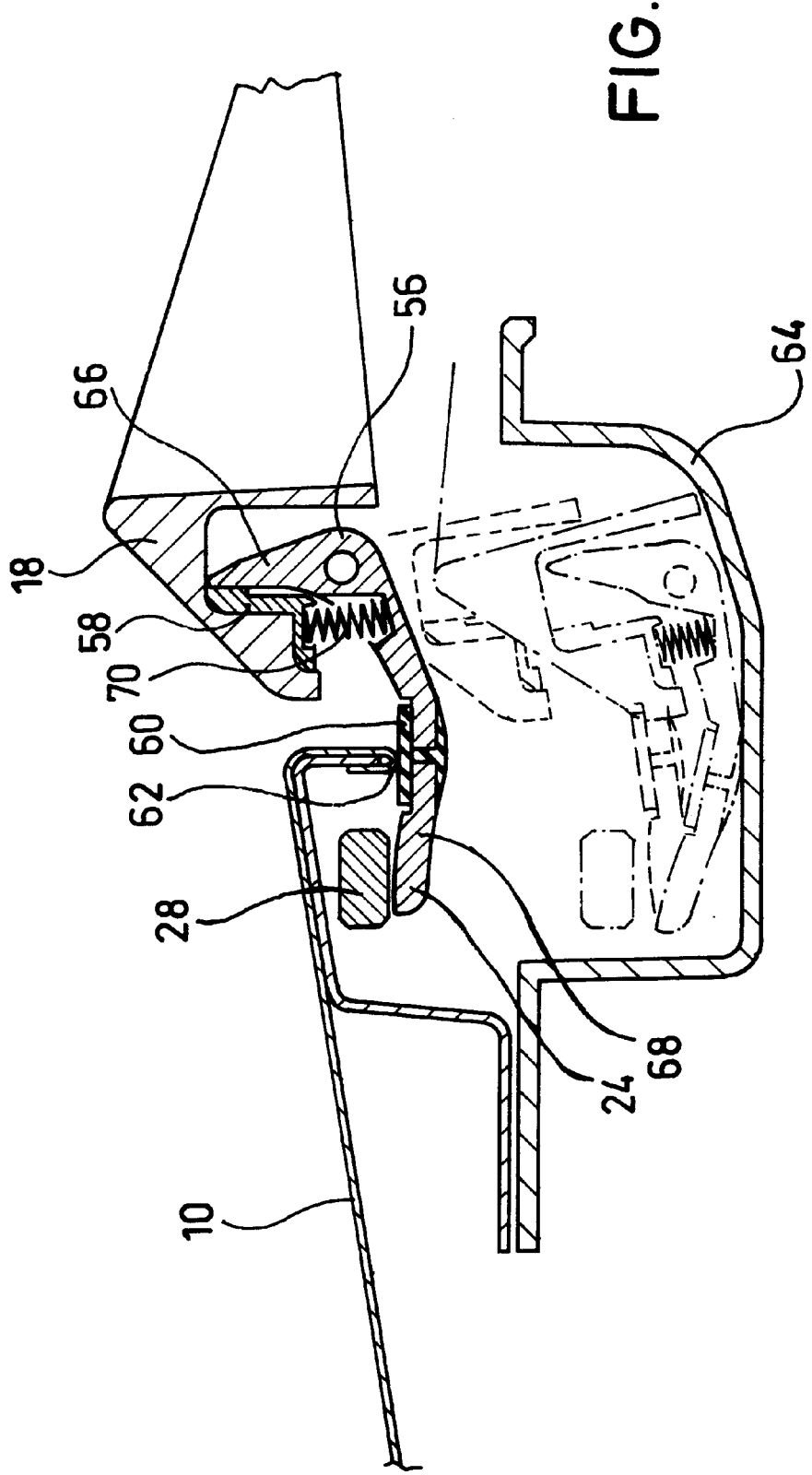
FIG. 3 is a sectional view through the front edge of the roof opening of FIG. 1.

In the version of the wind deflector device explained here, which is shown in FIG. 3, the driver 24 which interacts with the wind deflector 18 is made on a lever arm 56 which is hinged to the wind deflector 18. The lever arm 56 is made essentially L-shaped, the top, essentially vertically aligned lever arm 66 resting against an abutment 58 provided on the wind deflector 18, while on the end of the lower lever arm 68, the driver 24 is formed. A spring 70 pretensions the lever arm 56 such that the essentially vertically aligned lever arm 66 rests against the abutment 58. If the wind deflector 18 is lowered, by means of the downward motion of the stop 28, the vertical position of the wind deflector 18 can be reduced. If the stop 28 is moved up, the wind deflector 18 follows the motion of the stop 28 as a result of the action of the spring element 20. The maximum raised position of the wind deflector 18 is limited by a stop 60 which is attached to the lever arm 56, which is, for example, made of rubber, and which lies against a roof-mounted opposing surface 62 in the maximum raised position of the wind deflector 18.

If the wind deflector 18 is lowered in the direction of its neutral position when the cover element 14 is being closed, as was explained above with reference to FIG. 5, the stop 28 and the driver 24 disengage. Due to engagement of the lever arm 56 against the front part 64 of the frame which runs along the roof opening, and this can take place in turn using the stop 60, the lever arm 56 is swung clockwise in FIG. 4. The height of space required for the lowered wind deflector 18 and the associated lever mechanism 56 can be minimized in this way. If more room is available for lowering the wind deflector, in place of the driver 24 formed by the movable lever arm 56, a stationary driver can be attached to the wind deflector.

What is claimed is:

1. Device for influencing air flow in an area of a roof opening of an openable motor vehicle roof, comprising:
   a roof-mounted frame extending around the roof opening;
   a wind deflector which is located in the area of a front edge of the roof opening, which is pivotably mounted on the roof-mounted frame and which is raisable into an operating position under the influence of a spring force;
   at least one stop which is independent of displacement mechanisms of other movable roof components and which is positioned to limit raising motion of the wind deflector; and
   an adjustment means for changing the position of the stop and thus the degree of raising of the wind deflector;
   wherein the adjustment means comprises an actuating motor for moving the stop, an electronic control arrangement for triggering the actuating motor, and sensor technology coupled to the electronic control arrangement for determining at least one of motor vehicle speed and a degree to which the roof opening has been exposed.

2. Device as claimed in claim 1, wherein the stop is vertically adjustable.

3. Device as claimed in claim 1, wherein the adjustment means is located in the roof-mounted frame in the area of the front edge of the roof opening.

4. Device as claimed in claim 1, wherein there is more than one stop and the adjustment means further comprises a lever mechanism which simultaneously adjusts the position of all stops.

5. Device as claimed in claim 1, wherein the electronic control arrangement for triggering the actuating motor comprises means for storing at least one of pre-adjustable and freely selectable parameters.

6. Device as claimed in claim 1, wherein the actuating motor is located essentially in a transversely central area of the front edge of the roof opening.

7. Device as claimed in claim 6, wherein there is more than one stop and the adjustment means further comprises a lever mechanism which simultaneously adjusts the position of all stops; and wherein the lever mechanism has two essentially mirror-symmetrical lever components which are coupled in the area of the front edge of the roof opening; wherein one end of each lever component forms one of the stops for the wind deflector while an opposite end of the lever component is coupled to the actuating motor.

8. Device as claimed in claim 1, wherein a driver is mounted on the wind deflector which interacts with the stop.

9. Device as claimed in claim 8, wherein the driver is mounted on a pivoting lever arm which interacts with the wind deflector; and wherein an abutment is provided which counteracts pivoting of the lever arm when the stop engages the driver in order to limit raising of the wind deflector, but which allows pivoting of the lever arm when the wind deflector is lowered into an inactive neutral position.

10. Motor vehicle roof, comprising a fixed roof surface with a roof opening therein, a cover element for closing and at least partially exposing the roof opening, and a device for influencing the air flow, said device comprising:
    a roof-mounted frame extending around the roof opening;
    a wind deflector which is located in the area of a front edge of the roof opening, which is pivotably mounted on the roof-mounted frame and which is raisable into an operating position under the influence of a spring force;
    at least one stop which is independent of displacement mechanisms of other movable roof components and which is positioned to limit raising motion of the wind deflector; and
    an adjustment means for changing the position of the stop and thus the degree of raising of the wind deflector;
    wherein the adjustment means comprises an actuating motor for moving the stop, an electronic control arrangement for triggering the actuating motor, and sensor technology coupled to the electronic control arrangement for determining at least one of motor vehicle speed and a degree to which the roof opening has been exposed; and
    wherein the wind deflector is located in the roof-mounted frame and has a lowered, inactive neutral position under the cover element.

11. Motor vehicle roof as claimed in claim 10, wherein there is at least one hold-down which is connected to the cover element and which lowers the wind deflector during a closing motion of the cover element.

12. Motor vehicle roof as claimed in claim 10, wherein the stop is vertically adjustable.

13. Motor vehicle roof as claimed in claim 10, wherein the adjustment means is located in the roof-mounted frame in the area of the front edge of the roof opening.

14. Motor vehicle roof as claimed in claim 1, wherein there is more than one stop and the adjustment means further comprises a lever mechanism which simultaneously adjusts the position of all stops.

15. Motor vehicle roof as claimed in claim 10, wherein the electronic control arrangement for triggering the actuating motor comprises means for storing at least one of pre-adjustable and freely selectable parameters.

16. Motor vehicle roof as claimed in claim 10, wherein the actuating motor is located essentially in a transversely central area of the front edge of the roof opening.

17. Device as claimed in claim 16, wherein there is more than one stop and the adjustment means further comprises a lever mechanism which simultaneously adjusts the position of all stops; and wherein the lever mechanism has two essentially mirror-symmetrical lever components are coupled in the area of the front edge of the roof opening; wherein one of each lever component forms one of the stops for the wind deflector while an opposite end of the lever component is coupled to the actuating motor.

18. Device as claimed in claim 10, wherein a driver is mounted on the wind deflector which interacts with the stop.

19. Device as claimed in claim 18, wherein the driver is mounted on a pivoting lever arm which interacts with the wind deflector; and wherein an abutment is provided which counteracts pivoting of the lever arm when the stop engages the driver in order to limit raising of the wind deflector, but which allows pivoting of the lever arm when the wind deflector is lowered into an inactive neutral position.

* * * * *